Aug. 2, 1938.  C. CASEY, JR  2,125,667
PERMUTATION LOCK
Filed Feb. 2, 1937  2 Sheets-Sheet 1

Inventor
C. Casey, Jr.
By C. F. Wenderoth
Atty

Aug. 2, 1938.  C. CASEY, JR  2,125,667
PERMUTATION LOCK
Filed Feb. 2, 1937  2 Sheets-Sheet 2
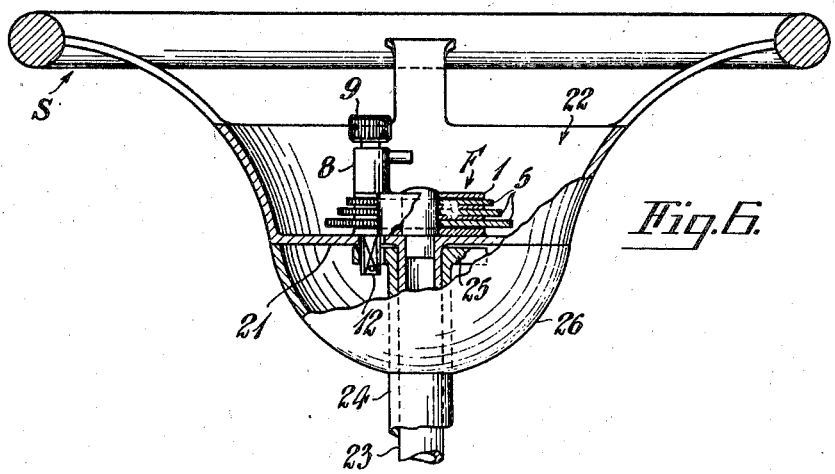
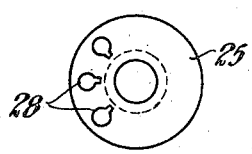
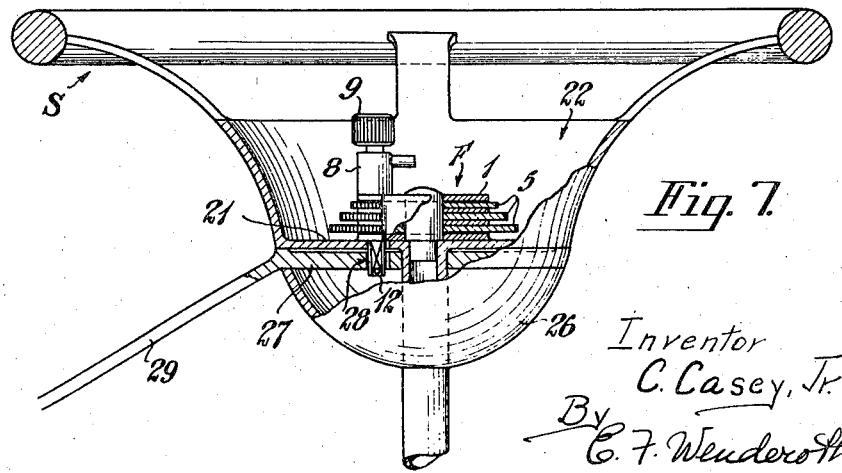
Inventor
C. Casey, Jr.
By C. F. Wenderoth
Atty Patented Aug. 2, 1938

2,125,667

UNITED STATES PATENT OFFICE 2,125,667

PERMUTATION LOCK

Charles Casey, Jr., St. Arnaud, Australia

Application February 2, 1937, Serial No. 123,711
In Australia February 14, 1936

4 Claims. (Cl. 70—312)

This invention refers to locks of the permutation type for locking relatively movable members one of which rotates, swings or slides, as for instance locking steering wheels of motor vehicles or doors and compartments thereof or doors of rooms and lids of cases.

The invention is particularly useful in preventing illicit use of motor vehicles and theft from parts of same.

An advantage in using the invention for locking steering wheels, doors or compartments of motor vehicles is that the usual number of keys necessarily carried by the driver of a motor vehicle is reduced.

According to one practical form of the invention as applied for locking the steering wheel of a motor vehicle, the lock is mounted in an axial recess formed in the top of the boss of said wheel so that the operating means of the lock are conveniently situated for manipulation. In such position moreover, it would be difficult for the lock to be surreptitiously broken open by the aid of a hack saw.

The lock is of simple form and the operating parts are rendered inaccessible to prevent tampering with the lock.

Briefly stated the housing or frame of the lock which is fixed to one of the relatively movable members contains a series of separated superposed manually rotatable discs bearing peripheral code symbols, each formed with a concentric arcuate slot and a hole located between the ends of said slot. A locking pin is adapted to be locked by said discs, said pin being eccentrically disposed relative to the axis of said discs and adapted to be manually moved longitudinally through said slots and holes in the discs to cause its inner end to interengage with an element on the other relatively movable member. The locking pin is preferably provided with an offset projection which will enter said element and engage a recess formed therein or pass through a key-hole slot formed in said element and retain the locking pin when it is partially rotated. When the locking pin is in this position the discs are partially rotated to interrupt the code whereby the retraction of the locking pin is prevented so that the relatively movable members are locked together.

Two portions of the locking pin are reduced in thickness or formed with flat portions which are narrower in one direction than the other to permit turning of the discs.

It will be understood that the permutation lock may be mounted on the stationary member, in which case the interengaging element would be on the movable member or vice versa. Furthermore the lock may be mounted on a stationary member and the interengaging element on a rotary member or vice versa, and in these latter cases a plurality of interengaging elements may be provided.

A feature of the invention is that a metal cover is provided over the interengaging element to render difficult surreptitious interference with the locking means.

Some practical forms of the invention are illustrated in the accompanying drawings whereof—

Fig. 1 is a plan of the lock.

Fig. 2 a vertical section on line II—II of Fig. 1 showing the lock in released position, and Fig. 3 a similar view of the lock in locked position.

Figs. 6 and 7 are views similar to Fig. 5 illustrating two other means of applying the lock for locking the steering wheel of a motor vehicle.

Fig. 8 is a plan of the flange shown in Fig. 6.

Figure 1:
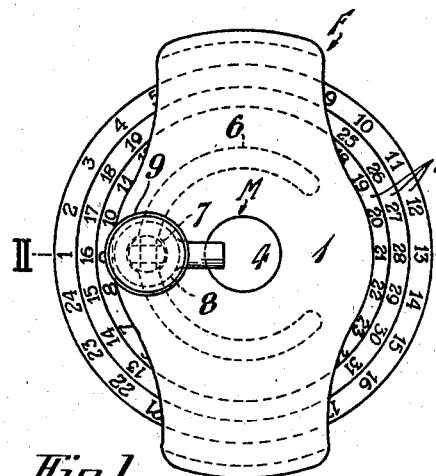

Herein the relatively movable members to be locked together are designated M and $M^1$.

According to one general illustration of the invention as shown in Figs. 1–5, the housing or frame F of the lock may consist of elongated top and bottom plates 1, 2, spaced apart and fixed to a cylindrical rod 4 which in this case is the fixed member M, said rod being disposed central of the housing F and welded to said plates.

The superposed circular discs 5 are formed centrally with holes to permit rotation on said rod and they are suitably separated by thin partitions or plates 30 fixed, as for instance by being welded to the rod 4. Each disc is formed with an arcuate slot 6 concentric with the rod and at any desired position between the ends of a slot, the latter is widened to form a hole 7 approximately of the same diameter as the cylindrical portion of a locking pin L, said hole being thus in communication with the slot and eccentrically disposed relative to the axis of the rod 4.

The locking pin L protrudes through a bearing sleeve 8 formed on top of plate 1 of the housing and it is formed on its exterior end with a finger grip or knob 9 and the shank of the pin within the housing is formed with a cylindrical barrel 10 of substantially the same diameter as the holes 7 formed through the discs.

On each side of the barrel 10 the shank is reduced in thickness or formed with flat portions 11 and 12 at approximately right angles to each other end of sufficient thinness to engage the arcuate slots 6 of the discs and permit one or more of the latter being rotated when either of the narrow edges of either of said flat portions is aligned with all the slots of the discs.

The inner end of the locking pin is adapted to enter an interengaging element E on the other member M¹ which in this case is assumed to be the movable member and said pin is provided with an offset projection or spigot 13. Said element E according to Figs. 1–4 may consist of a member formed with a guide or socket 14 formed with a longitudinal groove 18 which communicates at its inner end with an undercut recess 16 with which the projection 13 engages when the locking pin is partially rotated as for instance through 90°.

The bearing sleeve 8 is formed with a laterally projecting cylinder 17 containing a spring controlled ball 19 adapted to engage a cup-shaped recess formed in the side of the locking pin L to hold the latter in released position and prevent it being inadvertently turned.

The circular discs preferably diminish successively in size from the inner one to the outer to facilitate each being individually rotated through engagement by the fingers of the peripheral edges which are preferably milled. Moreover by this arrangement the code signals, such as numerals can be marked on the top of the discs near their peripheral edges so that all are clearly visible.

Figure 2:
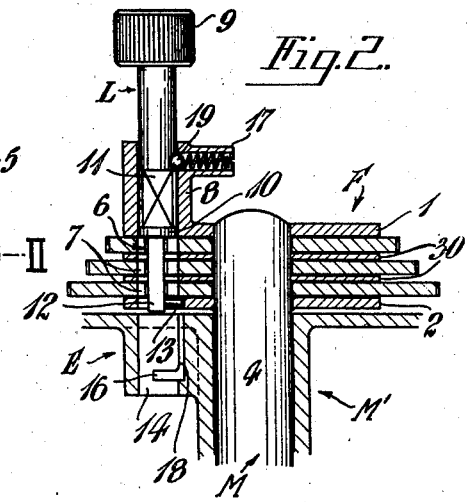
Figure 4:
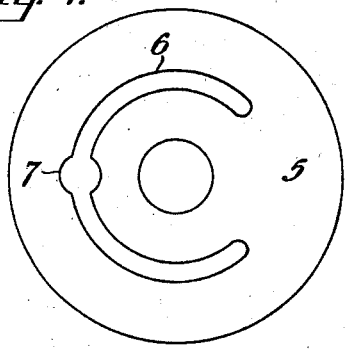
Fig. 4 is a detail plan view of one of the discs.
Figure 3:
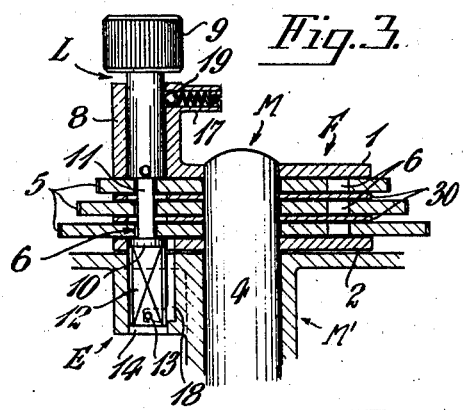

In Fig. 2 the discs are in coded positions and the locking pin L is shown released from the interengaging element E and retracted, said pin being temporarily held in this position by the spring-pressed ball 19 so that the member M and M¹ on which the lock and interengaging element are respectively fixed are free for relative movement.

With the locking pin L in this position partial rotation of one or more of the discs will prevent the code of the lock being noted and also prevent said pin from being accidentally pushed into locking position.

In order to lock one member M to the other member M¹ the locking pin L is pushed inwardly whereby its shank passes through the holes 7 in the discs and its inner end enters the guide or socket 14, the projection 13 sliding in groove 18. Said locking pin L is then partially rotated so that said projection enters recess 16. Alternatively the end of the pin with the projection passes through a key-hole slot formed in a plate constituting the interengaging element E, said pin being then partially rotated as above explained. By then partially rotating the discs and so disarranging the sequence of the code symbols the locked members M and M¹ can only be released by retracting the locking pin which is only practicable by one having knowledge of the code, turning the discs till their symbols are in prearranged sequence.

Any desired number of discs may be fitted within the housing or frame F and the holes 7 in the respective discs may be formed in various positions relative to the arcuate slots 6. Furthermore, the interengaging element is protected by a metal cover or bowl 15 welded in position to prevent tampering of said element or the inner end of the locking pin.

Figure 5:
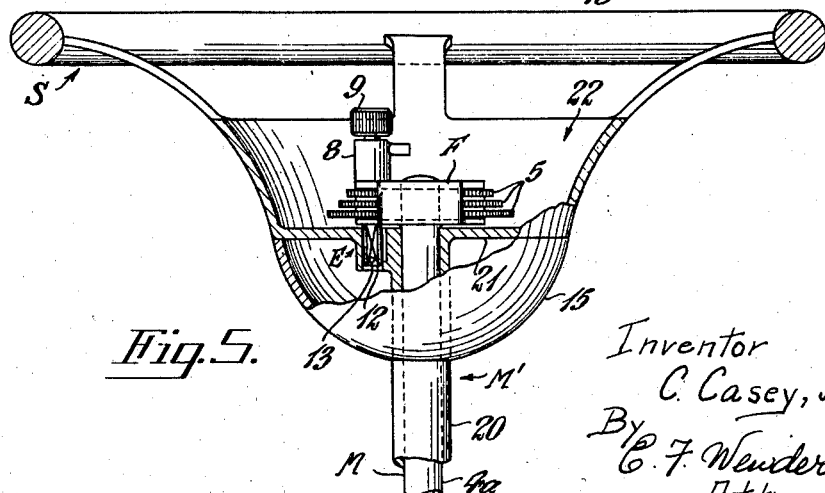
Fig. 5 is a view partly in section showing the lock used to lock the steering wheel of a motor vehicle.

Fig. 5 illustrates the invention applied for locking a rotary member to a stationary member and the illustration is that of the improved lock applied to the steering wheel S of a motor vehicle.

According to the form illustrated, the central fixed rod 4a of the housing F is extended through a rotary tubular steering column 20, said rod also passing through a hole formed centrally in the boss 21 of the steering wheel and being welded or anchored at its lower end to the chassis of the vehicle or a rigid member thereof.

A series of interengaging elements E are provided and such are fixed to the underside of the boss 21 in a curved row corresponding with the concentric arcuate curve of the slots in the discs. By this means the steering wheel may be turned into a series of locking positions, it being necessary to turn the wheel till one interlocking element E is coincident with the locking pin. By reason of the latter being eccentrically disposed relative to the axis of the steering wheel, said locking pin locks the wheel against turning when it enters an interlocking element E.

It will be noted that the lock is shown located in a cup-shaped portion 22 formed on the boss 21 of the steering wheel and such construction has the advantage of rendering it difficult for anyone to surreptitiously use a hack saw to break open the lock.

Fig. 6 illustrates the lock fixed to the top of the boss 21 of the steering wheel, and in this case the steering column 23 is located within a tubular casing 24 fixed to a rigid part of the vehicle. The upper end of the tubular casing 24 is provided with a flange disc or plate 25 formed with a series of interengaging elements in the form of key-hole slots 28 through any one of which the inner end of the locking pin may pass, said pin also passing through a hole formed in the boss 21. The flange disc or plate and the inner end of the locking pin are protected by a metal cover 26 welded to the tubular casing 24.

Fig. 7 illustrates an application of the lock to a steering wheel somewhat similar to that shown in Fig. 6 except that the tubular casing is dispensed with and a plate 27 formed with the interengaging elements in the form of key-hole slots 28 is provided on the upper end of an arm 29 secured to any suitable rigid member of the vehicle, said plate 27 being located below the boss 21 of the steering wheel.

I claim:

1. A permutation lock comprising a series of superposed separately rotatable coded discs located within a housing and centrally mounted on a fixed rod, each disc being formed with an arcuate slot concentric with said rod, said slot being widened at a position between its ends to form a hole, a locking pin eccentrically disposed relative to the discs and manually movable in a longitudinal direction and partially rotatable and adapted to pass through the holes in the discs and the housing and the shank of said locking pin formed with two separated flat portions at an angle to each other and an interengaging element with which the inner end of the locking pin is adapted to engage, said housing and interengaging element being fixed respectively to relative movable members to be locked.

2. A permutation lock as claimed in claim 1, and in which the inner end of the locking pin is provided with an offset projection and the interengaging element is formed with a socket provided with a longitudinal groove and with an end recess in communication with the inner end of said groove.

3. A permutation lock as claimed in claim 1, and in which the inner end of the locking pin is formed with an offset projection and the interengaging element consists of a flange disc formed with a plurality of keyhole slots with one of which said projection is adapted to engage.

4. A permutation lock as claimed in claim 1, and in which the outer end of the locking pin protrudes through the top of the housing and its flat portions are separated by a cylindrical portion adapted to pass through the holes in the discs.

CHARLES CASEY, Jr.